(12) United States Patent
Liu et al.

(10) Patent No.: US 6,286,671 B1
(45) Date of Patent: *Sep. 11, 2001

(54) CASE FOR HOLDING TWO COMPACT DISCS

(76) Inventors: Tak Lun Liu, 5 Shouson Hill Road #2, Hong Kong; Kwok Din Lau, 13A, Sze Ring Loong Ind. Bldg., 44 Lee Chung St., Chaiwan, both of (HK)

(*) Notice: Subject to any disclaimer, the term of this patent is extended or adjusted under 35 U.S.C. 154(b) by 0 days.

This patent is subject to a terminal disclaimer.

(21) Appl. No.: 08/908,857

(22) Filed: Aug. 8, 1997

(51) Int. Cl.[7] ................................. B65D 85/57
(52) U.S. Cl. ......................... 206/308.1; 206/310
(58) Field of Search .................. 206/308.1, 310, 206/312

(56) References Cited

U.S. PATENT DOCUMENTS

| | | | | |
|---|---|---|---|---|
| 4,535,888 | * | 8/1985 | Nusselder | 206/308.1 X |
| 4,793,480 | * | 12/1988 | Gelardi et al. | 206/312 |
| 5,244,085 | * | 9/1993 | Lammerant et al. | 206/308.1 |
| 5,259,498 | * | 11/1993 | Weisburn et al. | 206/308.1 X |
| 5,284,248 | * | 2/1994 | Dunker | 206/308.1 |
| 5,477,960 | * | 12/1995 | Chen | 206/308.1 |
| 5,542,531 | * | 8/1996 | Yeung | 206/308.1 |
| 5,685,425 | * | 11/1997 | Choi | 206/310 |
| 5,727,680 | * | 3/1998 | Liu | 206/308.1 |

* cited by examiner

Primary Examiner—Bryon P. Gehman
(74) Attorney, Agent, or Firm—Hodgson Russ LLP

(57) ABSTRACT

A case for holding two compact discs including first and second cover parts pivotally connected together so that they can be pivoted between a closed position facing each other and an open position and characterized by a tray comprising a planar body portion and an anchor portion, the tray body portion including an annular rosette of fingers on each side thereof for releasably securing a compact disc thereto, the tray body and the tray anchor being pivotally connected together and the tray anchor being secured to one of the cover parts. As a result, when the cover parts are pivoted to an open position the tray body can be pivoted about the tray anchor to facilitate installation and removal of compact discs from both sides of the tray body. The separate tray body and anchor portions together with the nature of the pivotal connection therebetween provide a structure which is strong and long-lasting and which is compatible with automated assembly techniques.

8 Claims, 8 Drawing Sheets

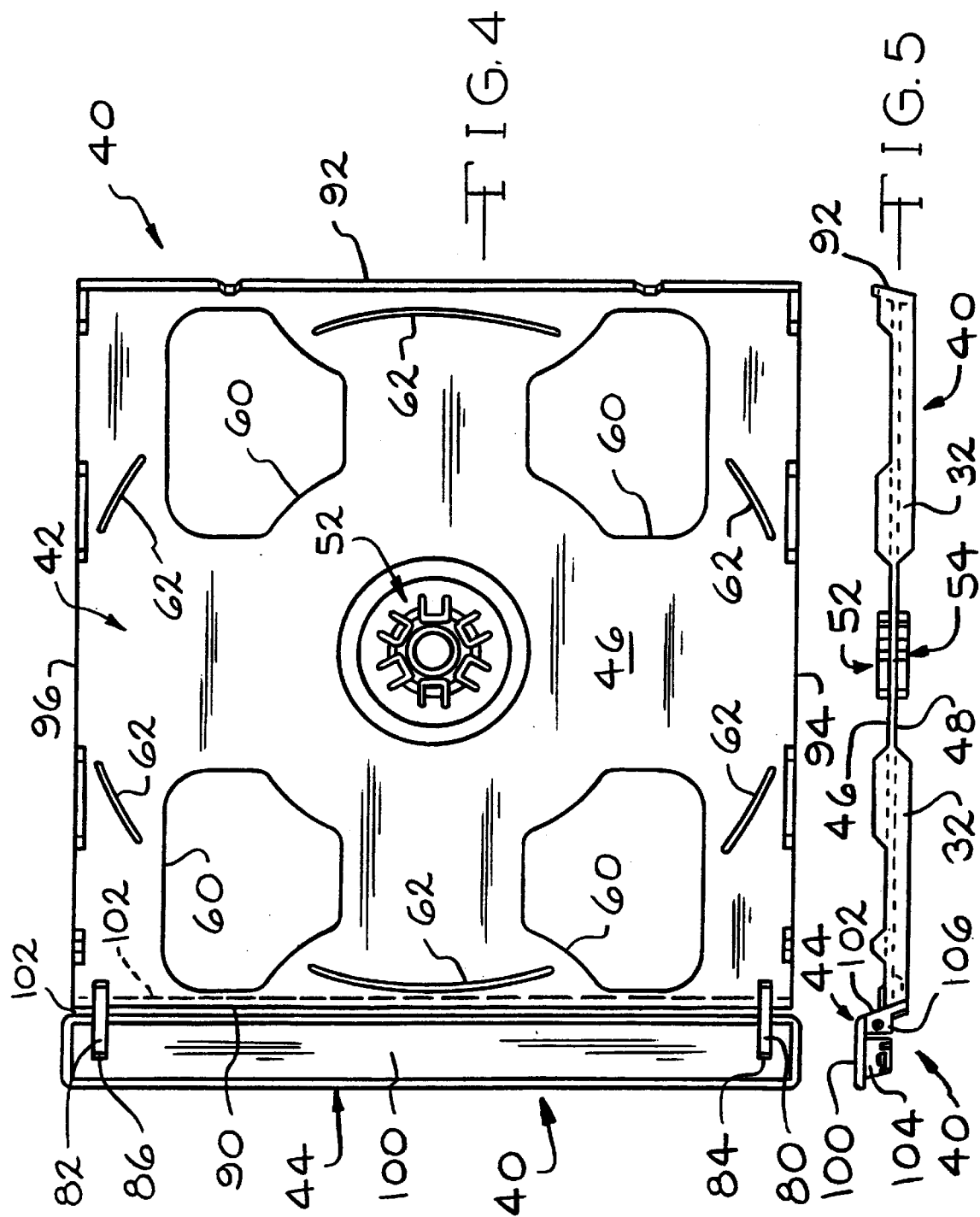

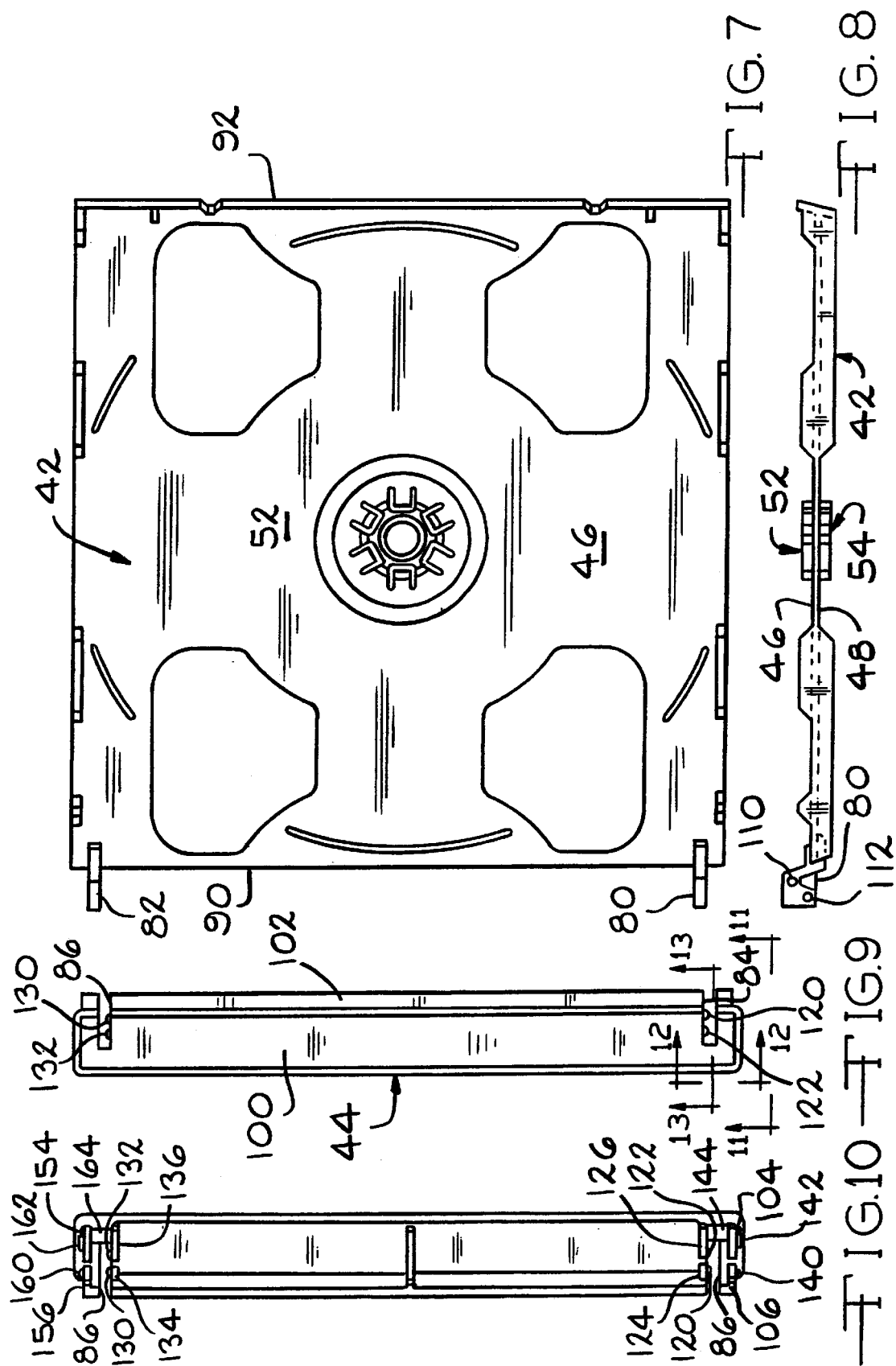

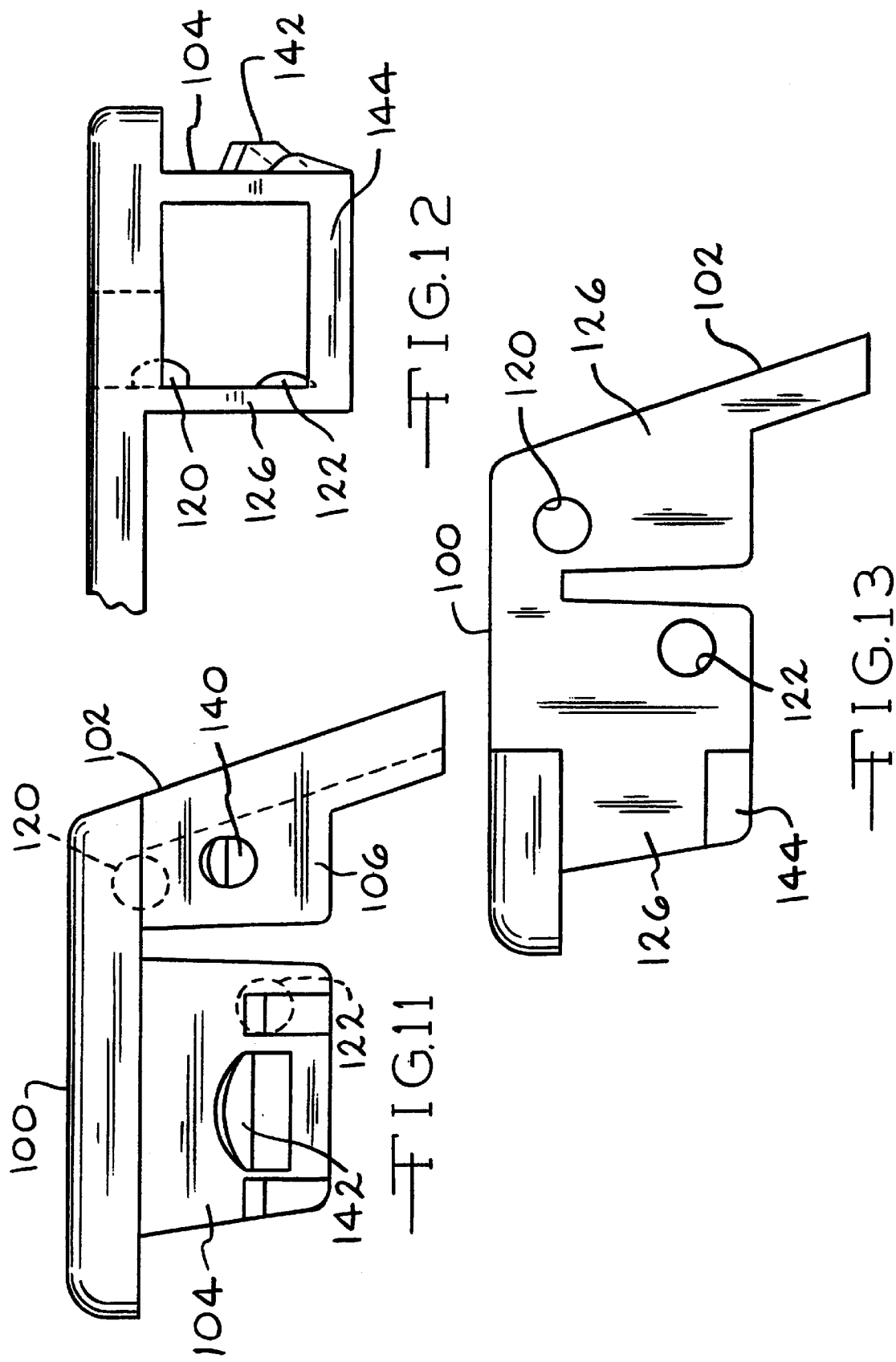

CASE FOR HOLDING TWO COMPACT DISCS

BACKGROUND OF THE INVENTION

This invention relates to the art of storage cases for compact discs, and more particularly to a new and improved case for holding a pair of compact discs.

In a basic compact disc storage case, a first or front cover part is pivotally connected along one end or edge to a second or rear cover part for opening and closing the storage case. A tray structure mounted within the case is provided with an annular rosette of flexible fingers which releasably engage the central opening of a compact disc for releasably securing the disc to the tray. An example of a basic storage case for holding a single compact disc is found in U.S. Pat. No. 5,259,498.

Recently, compact disc storage cases have been proposed for carrying two compact discs therein. In a basic two compact disc storage case, the tray is provided with a pair of rosettes of fingers, one on each side of the tray, and the tray is pivotally connected to the case, in particular to walls of one of the cover parts, to provide access to both compact discs held thereon. Examples of storage cases for holding a pair of compact discs are found in U.S. Pat. No. 5,244,085 and British Patent No. 2,261,210.

At least two important considerations arise in designing the structure of a two compact disc storage case. One is durability, strength and wear life of the pivotal connection of the tray in the case. Each time the case is opened the tray itself may be pivoted back and forth several times as the user selects a compact disc and removes it from the tray or secures it to the tray after use. Also, as the user manipulates the tray and the rosettes of fingers thereon during removal and replacement of the compact disc, such manipulation imposes stress on the pivotal connection. Another important design consideration is that the manner in which the tray is connected to the case be compatible with the assembly methods involved in automated machinery for manufacturing such compact disc storage cases.

SUMMARY OF THE INVENTION

It is, therefore, a primary object of this invention to provide a new and improve case for holding a pair of compact discs.

It is a further object of this invention to provide such a compact disc storage case having a new and improved structure for providing pivotal movement of the compact disc holding tray within the case.

It is a more particular object of this invention to provide such a tray pivot structure which has improved durability and strength.

It is a more particular object of this invention to provide such a tray pivot structure which is compatible with automated assembly techniques for manufacturing compact disc storage cases.

It is a further object of this invention to provide such a compact disc storage case which is convenient and economical to manufacture and easy to use.

The present invention provides a case for holding two compact discs or the like including first and second cover parts pivotally connected together so that they can be pivoted between a closed position facing each other and an open position and characterized by a tray comprising a planar body portion and an anchor portion, the tray body portion including means on each side thereof for releasably securing a compact disc thereto, means for pivotally connecting the tray body and the tray anchor together and means for securing the tray anchor to one of the cover parts. As a result, when the cover parts are pivoted to an open position the tray body can be pivoted about the tray anchor to facilitate installation and removal of compact discs from both sides of the tray body. The separate tray body and anchor portions together with the nature of the pivotal connection therebetween provide a structure which is strong and long-lasting and which is compatible with automated assembly techniques.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 4 is a plan view of the tray structure in the case of FIGS. 1–3 comprising a tray anchor portion and a tray body position;

FIG. 5 is a side elevational view of the tray structure of FIG. 4;

FIG. 7 is a top plan view of the body portion of the tray structure of the present invention;

FIG. 8 is a side elevational view thereof;

FIG. 9 is a top plan view of the anchor portion of the tray structure of the present invention;

FIG. 10 is a bottom plan view thereof;

FIG. 11 is an enlarged elevational view taken about on line 11—11 in FIG. 9;

FIG. 12 is an enlarged fragmentary sectional view taken about on line 12—12 in FIG. 9;

FIG. 13 is an enlarged sectional view taken about on line 13—13 in FIG. 9;

DETAILED DESCRIPTION OF THE ILLUSTRATED EMBODIMENT

Figure 1:
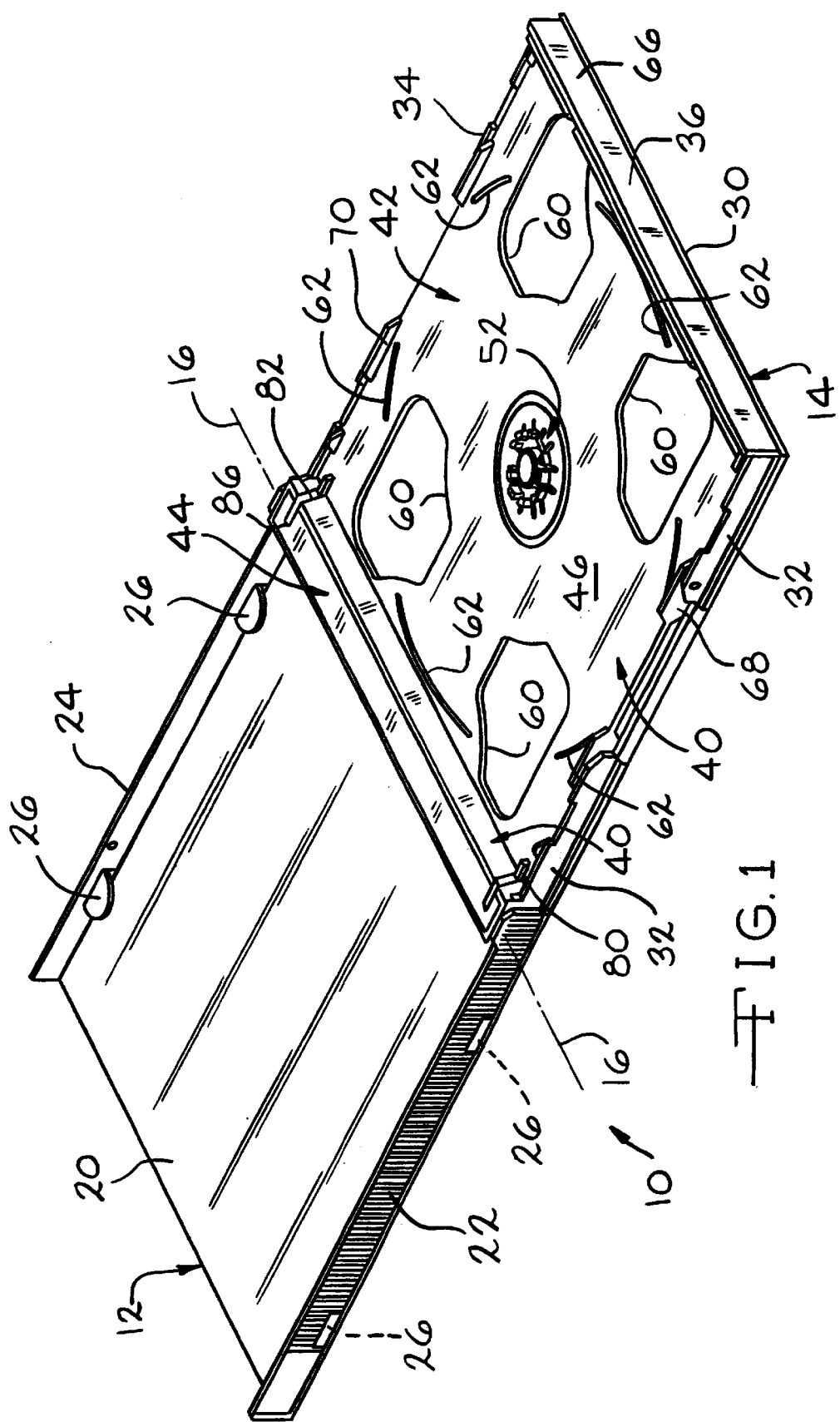
FIG. 1 is a perspective view of a compact disc storage case according to the present invention showing the tray adjacent one of the cover parts.
Figure 2:
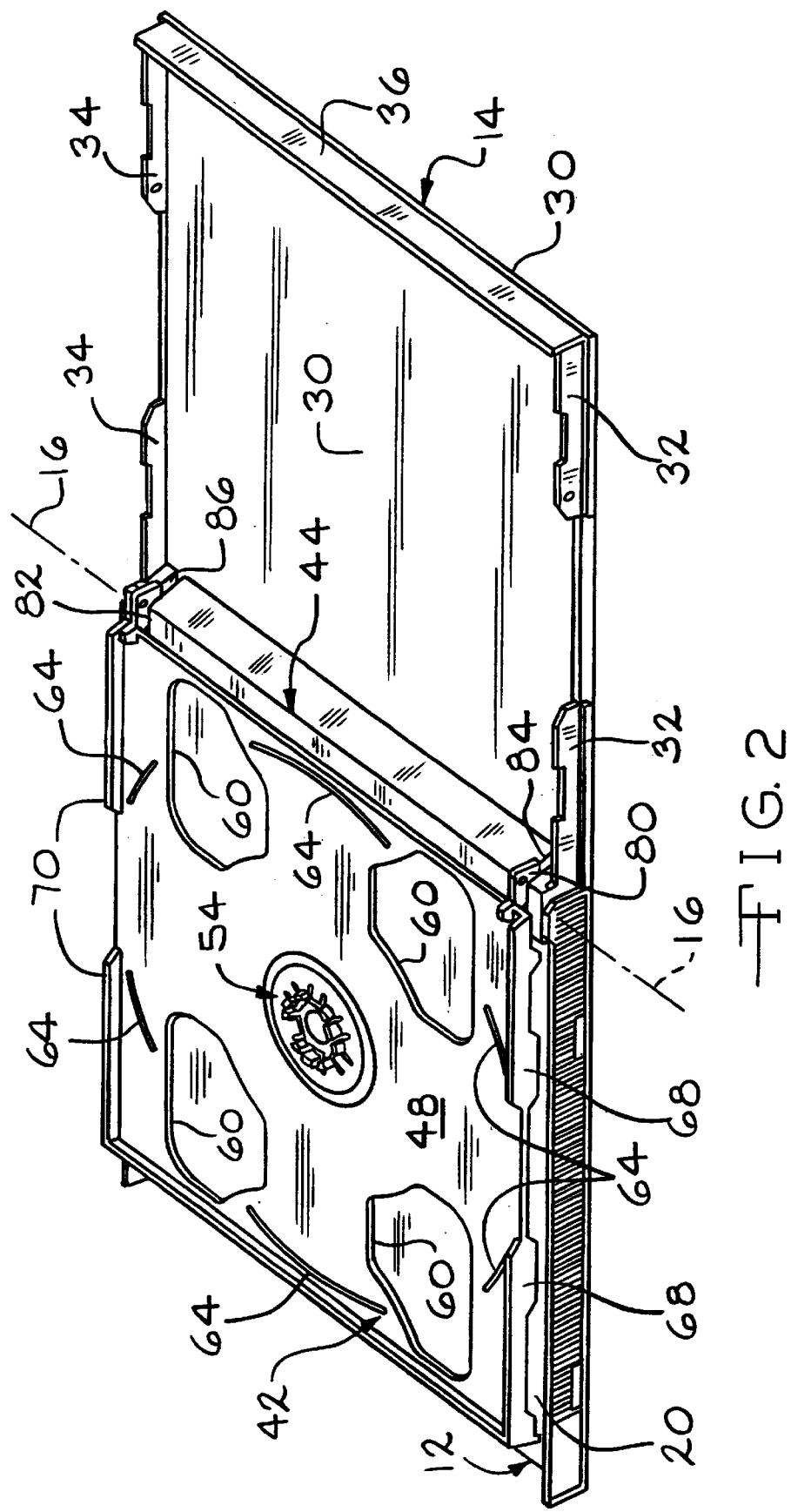
FIG. 2 is a perspective view similar to FIG. 1 showing the tray pivoted to a position adjacent the other of the cover parts.

Referring first to FIGS. 1 and 2, there is shown a case 10 for holding two compact discs according to the present invention. Case 10 includes a first cover part 12 and a second cover part 14 pivotally connected together along an axis designated 16. Case 10 is shown in the fully open position wherein parts 12 and 14 define therebetween an angle of 180°, and the parts are pivotally moved to a closed position where they face each other in a known manner. The parts 12 and 14 are made of thermoplastic material which is well known in the art.

The first cover part 12 comprises a solid rectangular base plate 20 and a pair of upstanding sidewalls 22 and 24 as shown in FIG. 1. Tabs 26 are formed to extend inwardly from walls 22, 24 and spaced from base 20 for the purpose of retaining a paper insert of graphical or textual promotional material. The second cover part 14 comprises a solid rectangular base plate 30, a pair of upstanding sidewalls 32 and 34 and an upstanding end wall 36 joining the sidewalls 32, 34 as shown in FIG. 2.

The walls 32, 34 of cover part 14 are arranged so that they fit closely within walls 22, 24 of part 12 when the two parts are pivoted to a closed position, and end wall 36 of part 14 completes the enclosure of the interior region between the closed cover parts 12 and 14. A pivot hinge is defined, for example, by cylindrically shaped projections (not shown) extending inwardly from walls 22, 24 which fit in corresponding circular openings (not shown) in walls 32, 34 in a known manner, the axes of the projections and the centers of the openings being the pivot axis 16.

In accordance with the present invention, case 10 further comprises a tray 40 for holding a pair of compact discs and including a tray body portion 42 pivotally connected to a tray anchor portion 44 which is secured to one of the cover parts 12, 14. Tray body 42 is in the form of a plate having oppositely disposed surfaces 46 and 48 which are seen in FIGS. 1 and 2, respectively, which show tray body 42 adjacent cover parts 14 and 12, respectively. Tray body 12 includes means on each surface 46, 48 for releasably securing a compact disc. In particular, a first rosette 52 of annularly disposed flexible fingers is formed on surface 46 for releasably securing a compact disc at the central opening thereof in a known manner. Similarly, a second rosette 54 of annularly disposed flexible fingers is formed on surface 48 for releasably securing a compact disc at the central opening thereof in a known manner. Tray body 42 includes a plurality of openings 60 extending therethrough, in the present illustration four, through which the user may place a finger around the edge of a CD to facilitate removal from the tray. Surface 46 includes arcuate ribs 62 formed thereon to serve as a guide for the edge of a CD carried on that surface. Similarly, surface 48 includes arcuate ribs 64 formed thereon to serve as a guide for the edge of a CD carried on that surface. Tray body 42 also is provided with an end wall 66 and a pair of side walls 68 and 70 which define a rim around the periphery of tray body 42 to provide support for protecting the CD's carried thereby when the cover parts 12 and 14 are closed. Tray body can be of the same plastic material as cover parts 12, 14.

Tray body 42 is provided on the end opposite wall 66 with a pair of spaced apart substantially parallel arms or tabs 80 and 82 which are disposed in planes substantially perpendicular to the plane of tray body 42. Arms 80 and 82 are of substantial thickness and are received in recesses 84 and 86, respectively, formed in tray anchor portion 44 for providing the pivotal connection between tray body 42 and tray anchor. The structure for pivotally connecting the arms or tabs 80, 82 in the recesses 84, 86 will be described in detail presently. Tray anchor portion 44 is an elongated rectangular structure molded from the same plastic material as tray body 42 and the cover parts 12, 14. Anchor portion 44 is disposed so that the longitudinal axis thereof is disposed substantially parallel to the axis 16 of the pivotal hinge connection between cover parts 12, 14. The structure of the tray anchor portion and the manner on which it is secured to one of the cover parts 12, 14 will be described in detail presently.

Figure 3:
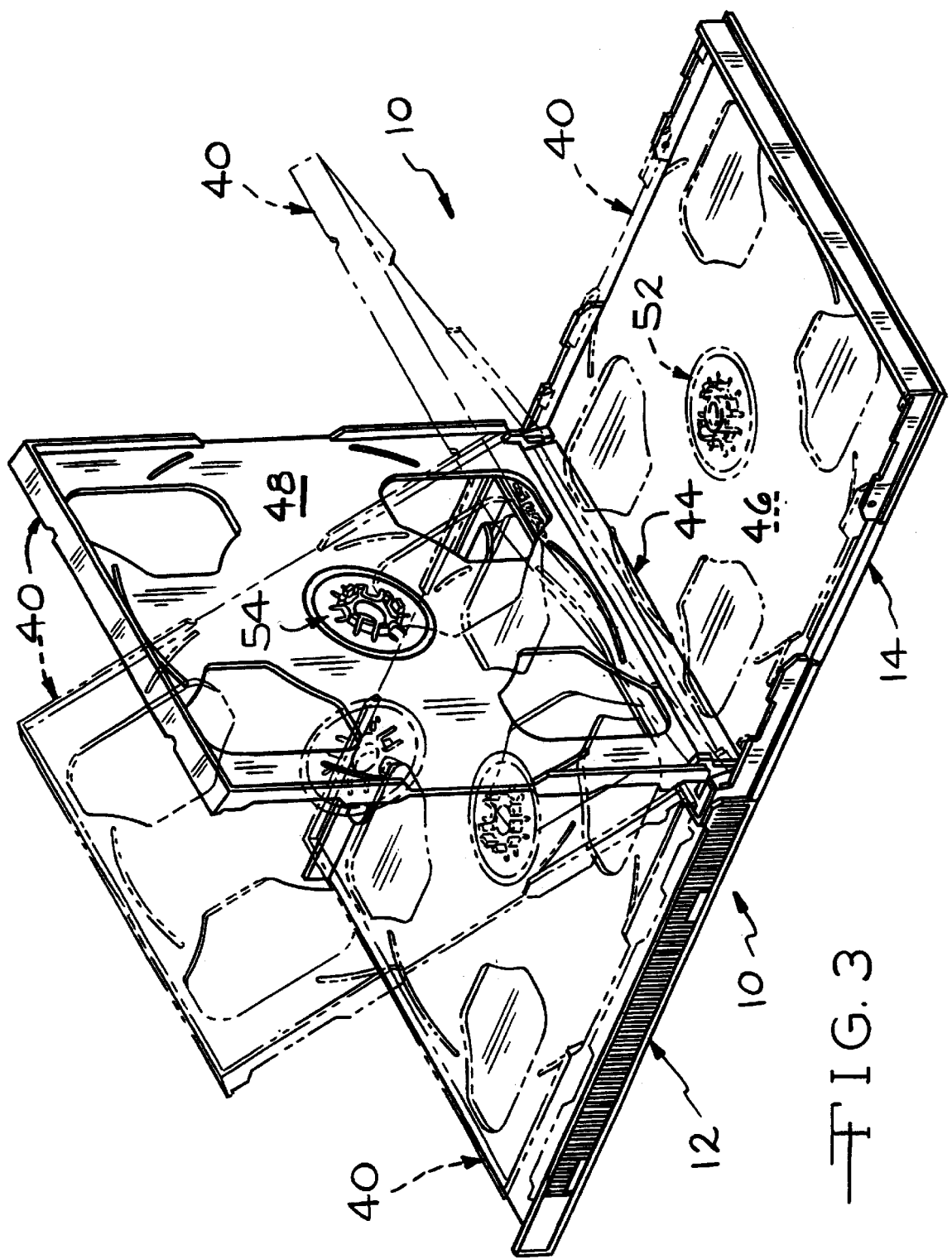
FIG. 3 is a perspective view similar to FIGS. 1 and 2 showing the tray in various positions during pivotal movement between the two cover parts.

FIG. 3 shows the various possible locations of tray 40 as it is pivoted through 180 degrees of pivotal movement between positions in facing engagement with cover parts 12 and 14. The solid line representation of tray 40 in FIG. 3 shows the mid-way or 90 degree position, and the broken line representations show various other locations of tray 40 during the pivoted movement thereof. Thus a user simply can grasp tray 40 by hand and move it as shown in FIG. 3 to gain access to either side of tray 40 to remove a compact disc for use and to replace the CD on tray 40 after its use.

An important advantage of the provision of tray anchor portion 44 separate from tray body portion 42 is that the pivotal connection between the tray body and anchor portions 42 and 44, respectively, is durable, strong and long lasting. This is a result of the provision of the arms or tabs 80 and 82 on tray body position 42 which are received in the recesses 84 and 86, respectively, in the tray anchor portion 44. Any laterally directed forces or stresses imposed on the pivotal connection will not disengage or dislodge the connection because the arms 80 and 82 are supported and contained in a lateral sense by the recesses 84 and 86 in tray anchor portion 44. In addition, the pivotal connections are located laterally inwardly of the side edges of the tray body portion and thus are isolated from any stresses acting along the edges or at the corners of tray body portion 42. The foregoing is important when one considers the various angular positions in which a user can manipulate tray body 42, as illustrated in FIG. 3, with the result that a wide variety of magnitudes and directions of forces or stresses can be imposed on tray body 42 by the hands of the user. Another need for a strong, durable pivotal connection arises from the fact that during the life of a compact disc case, the tray body 42 typically will be moved back and forth a number of times significantly greater than the number of times the cover parts 12, 14 are opened and closed. In other words, once a user opens the cover parts 12, 14 he may pivot tray body 42 back and forth a number of times such as to inspect the CD's before selection and removal from the case.

The tray body 42 and tray anchor 44 combination is shown in further detail in FIGS. 4 and 5. The arms or tabs 80 and 82 of tray body portion 42 are of a width or thickness such that they fit closely but movably within the recesses 84 and 86, respectively, of tray anchor portion 44. Tray body 42 has a pair of end edges 90 and 92 which are spaced-apart and mutually parallel. In the assembled case 10 as shown in FIGS. 1–3, edges 90, 92 also are substantially parallel to pivot axis 16. Edges 90 and 92 are joined by a pair of mutually parallel side edges 94 and 96. The arms or tabs 80 and 82 extend from one of the end edges, for example edge 90, and are spaced inwardly of side edges 94 and 96 as shown in FIG. 4. Anchor portion 44 includes a top wall 100 extending along the entire length of portion 44, an inclined front wall 102 extending from top wall 100 toward surface 46 of tray body 42 and extending along substantially the entire length of portion 44 and a series of wall-like members, two of which are designated 104 and 106 in FIG. 5, extending from walls 100 and 102 for a purpose which will be described.

The combination of tray body portion 42 and tray anchor portion 44 is shown in FIGS. 4 and 5 in its assembled condition before installation in case 10. In accordance with another aspect of the present invention, in the assembled condition of FIGS. 4 and 5, and prior to installation in case 10, the portions 42 and 44 are locked or maintained in the relative positions shown in FIGS. 4 and 5, i.e. tray body 42 cannot be pivoted relative to tray anchor. However, once the combination of FIGS. 4 and 5 is installed in case 10, tray body portion 42 is pivotally movable relative to tray anchor portion 44 as shown in FIG. 3. This renders the tray body and anchor combination structure compatible with automatic machinery for assembling the parts of compact disc holding cases such as case 10. This is provided by co-operating structures on arms 80 and 82, in recesses 84 and 86 and on the part 12 or 14 of case 10 to which anchor portion 44 is secured in a manner which will be described in detail presently.

Figure 6:
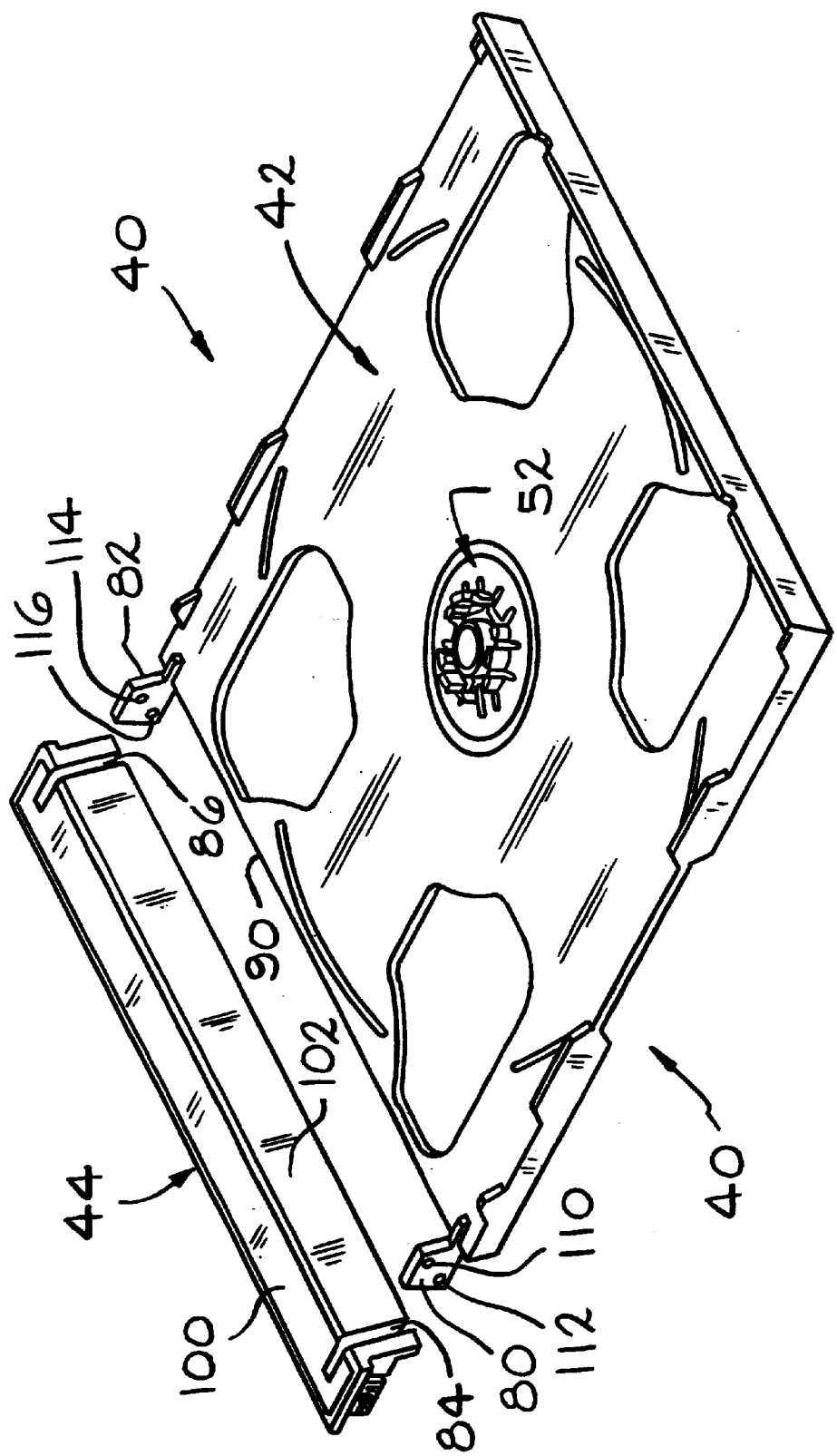
FIG. 6 is a perspective view showing the tray structure of FIGS. 4 and 5 before the anchor and body portions are pivotally connected together.

FIG. 6 shows the tray body portion 42 and tray anchor portion 44 before being connected together. As shown in FIG. 6 each of the arms or tabs 80 and 82 is provided with a pair of spaced-apart apertures or openings extending therethrough. In particular, tab 80 is provided with openings 110, 112 and tab 82 is provided with openings 114, 116. On each tab, one of the openings receives a stud or projection (not shown in FIG. 6) on tray anchor 44 rotatably therein to define the pivotal connection between tray body 42 and tray anchor 44. In the illustrative device shown, the opening 110 on tab 80 and the opening 114 on tab 84 define the pivotal connection with the co-operating studs (not shown). On each tab, the other opening co-operates with another stud or projection (not shown in FIG. 6) on tray anchor 44 to lock tray body 42 and tray anchor 44 against pivotal movement when connected together and prior to being assembled in case 10. In the illustrative device shown, the opening 112 on tab 80 and the opening 116 on tab 82 co-operate with studs or projections (not shown) to define the releasable locking relationship. In accordance with the present invention, when the assembled combination of tray body 42 and tray anchor 44 is assembled into case 10, with tray anchor 44 secured to one of the cover parts 12, 14, the openings 112 and 116 on tabs 80 and 82 no longer are in engagement with the co-operating studs or projections with the result that tray body 42 is freely pivotally movable about its connection to tray anchor 44. The structure for accomplishing this will be shown and described presently.

FIGS. 7 and 8 show tray body 42 in further detail, and the tray anchor portion 44 is shown in more detail in FIGS. 9 and 10. In the top plan view of FIG. 9 the previously mentioned studs or projections are seen in the recesses 84 and 86. In particular, extending into recess 84 is a first stud or projection 120 for fitting into opening 110 in tab 80 to define one end of the pivotal connection between tray body 42 and tray anchor 44. A second stud or projection 122 extends into recess 84 for fitting into opening 112 in tab 80 to define the releasable locking relationship between tray body 42 and tray anchor 44. This will be shown and described in further detail presently. As shown in the bottom plan view of FIG. 10, the studs 120 and 122 extend from depending wall sections 124 and 126, respectively, within tray anchor portion 44. Similarly, extending into recess 86 is a first stud or projection 130 for fitting into opening 114 in tab 82 to define the other end of the pivotal connection between tray body 42 and tray anchor 44. A second stud or projection 132 extends into recess 86 for fitting into opening 116 to define the releasable locking relationship between tray body 42 and tray anchor 44 which will be shown and described in further detail presently. As shown in FIG. 10, the studs 130 and 132 extend from depending wall sections 134 and 136, respectively, within tray anchor portion 44.

The enlarged view of FIG. 11 shows the wall-like members 104 and 106 extending from walls 100 and 102 as described in connection with FIG. 5. The members 104 and 106 are located a short distance inwardly from one end of anchor portion 44 as shown in FIG. 10. A stud or projection 140 on member 106 is received in an opening (not shown) in the side wall 32 of cover part 14 to secure tray anchor portion 44 in cover part 14 in a known manner. A projecting formation 142 on member 104 serves to move stud 122 out of opening 112 when anchor portion 44 is secured to cover part 14 as will be described in detail presently. A link member 144 joins member 104 and wall 126 as shown in FIGS. 10, 12 and 13 for a purpose to be described.

In a similar manner, tray anchor portion 44 is provided with a corresponding pair of wall-like members 154 and 156 extending from walls 100 and 102 and located a short distance inwardly from the opposite end of anchor portion 44 as shown in FIG. 10. A stud or projection 160 on member 156 is received in an opening (not shown) in the side wall 34 of cover part 14 to secure tray anchor portion 44 in cover part 14 in a known manner. A projecting formation 162 on member 154 serves to move stud 132 out of opening 116 when anchor portion 44 is secured to cover part 14 as will be described in detail presently. A link member 164 joins member 154 and wall 136 as shown in FIG. 10 for a purpose to be described.

The compact disc carrying case 10 according to the present invention is manufactured and assembled in the following manner. The first and second cover parts 12 and 14, respectively, and the tray body and anchor portions 42 and 44, respectively, are molded from plastic material. The specific molding techniques form no part of the present invention and are well-known to those skilled in the art. Tray body 42 and tray anchor portion then are moved relative to each other from positions shown in FIG. 6 to the assembled condition illustrated in FIGS. 4 and 5. This assembly step includes inserting the arms or tabs 80 and 82 of tray body 42 into the slots or recesses 84 and 86, respectively, of tray anchor 44. When this is completed, studs 120 and 122 on tray anchor 44 snap into openings 110 and 112, respectively, on tab 80 and studs 130 and 132 snap into openings 114 and 116, respectively, on tab 82. As previously described, at this stage of the assembly operation, tray body 42 is fixed and not pivotally movable relative to tray anchor 44.

After tray body 42 and tray anchor 44 are connected together, the combination is assembled with the tray cover part 14. This is done by moving the tray body and anchor combination into position with the ends of anchor portion 44 between the side walls 32 and 34 of cover part 14. As the ends of anchor portion 44 are moved within walls 32 and 34 in a direction away from the opposite edge 30 of cover part 14, the studs or projections 140 and 160 on the opposite ends of tray anchor portion 44 shown in FIG. 10 snap into openings provided in side walls 32 and 34, respectively, to secure tray anchor 44 to cover part 14. Also, as the ends of anchor portion 44 move within walls 32, 34 the projecting formations 142 and 162 are contacted by the surfaces of walls 32 and 34, respectively, and are moved inwardly in a camming-like action to cause inward movement of each of the structures comprising member 104, link 144 and wall 126 and member 154, link 164 and wall 136. This, in turn, moves the studs 122 and 132 out of the openings 112 and 116 in arms 80 and 82 so that when tray anchor 44 is secured in cover part 14, tray body 42 is pivotally movable in anchor portion 44 as previously described. The thickness of the members and walls and the resiliency of the plastic material permits the foregoing flexural movement.

Figure 14:
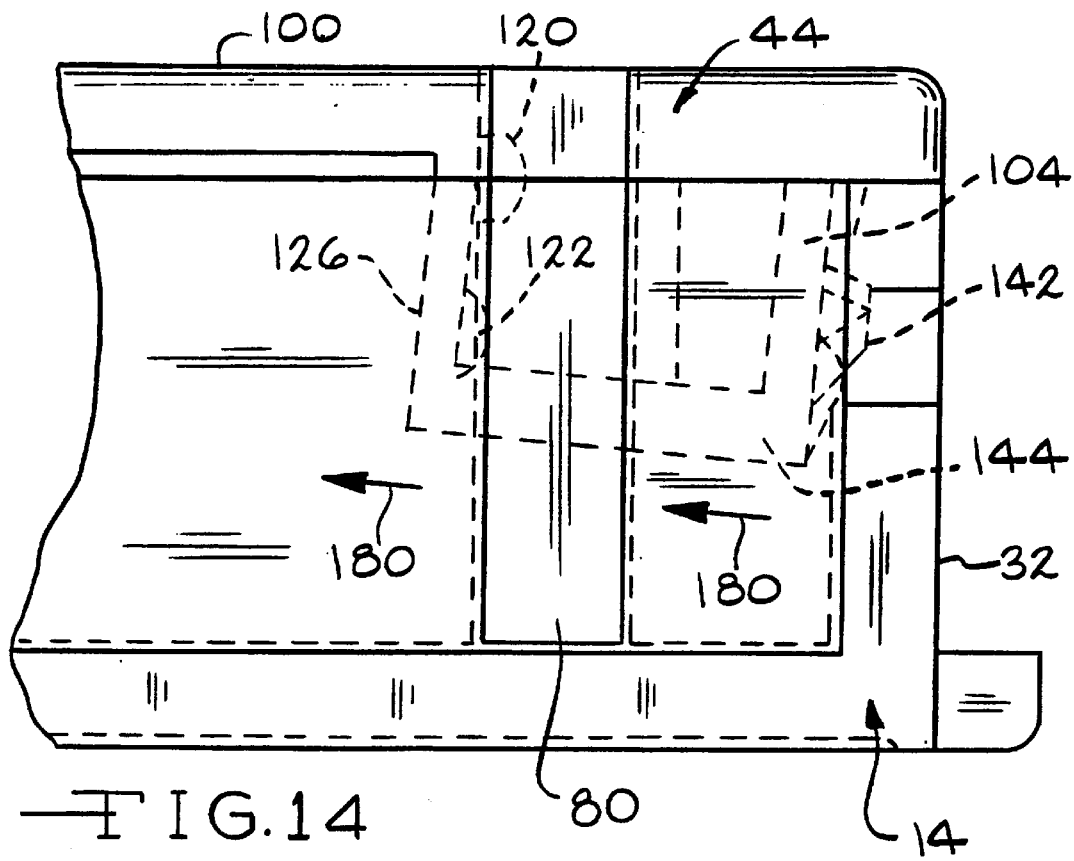
FIG. 14 is an enlarged fragmentary elevational view illustrating assembly of the tray structure of the present invention in a case.
Figure 15:
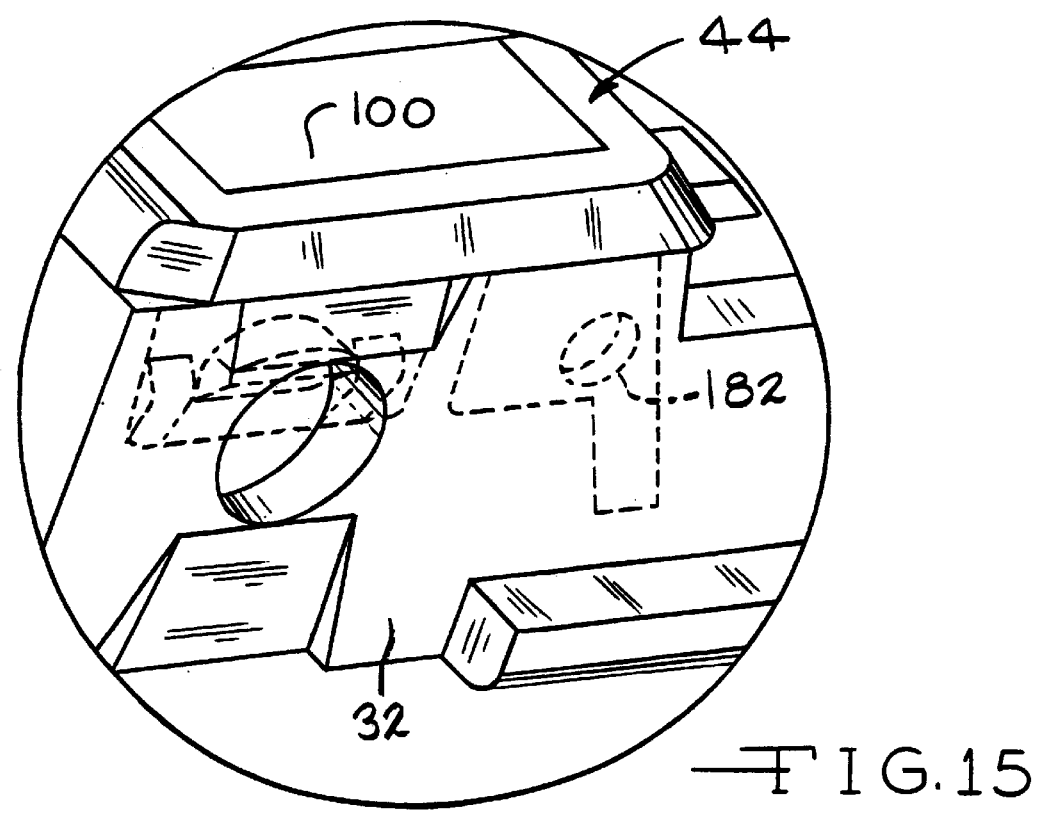
FIG. 15 is an enlarged fragmentary perspective view further illustrating assembly of the tray structure of the present invention in a case.

The foregoing is illustrated in the enlarged views of FIGS. 14 and 15. FIG. 14 illustrates the inward movement in the direction of arrows 180 of the combination of member 104, link 144 and wall 126 caused by the camming action of the inner surface of side wall 32 on formation 142. As can be seen in FIG. 14, stud 122 is moved out of opening 112 in tab 80 while stud 120 is retained in opening 110. FIG. 15 also illustrates an opening 182 through side wall 32 to receive stud 140 for securing tray anchor 44 in place as previously described. A similar camming action between the inner surface of side wall 34 and formation 162 (not shown) moves the combination of member 154, link 164 and wall 136 inwardly in a direction opposite to that of arms 180.

The assembly of case 10 is completed by joining the first cover part 12 to the second cover part 14 as previously described and in a manner well-known to those skilled in the art. Alternatively, cover parts 12 and 14 could be first connected together and then the tray anchor-tray body combination connected into cover part 14.

It is therefore apparent that the present invention accomplishes its intended objects. The separate tray body 42 and tray anchor 44, together with the nature of the pivotal connection therebetween, provide a structure which is strong and long lasting. The co-operating structure on the tray anchor and tray body portions and on the tray cover part render the arrangement compatible with automated assembly techniques.

While an embodiment of the present invention has been described in detail, that has been done for purposes of illustration, not limitation.

What is claimed is:

1. A case for holding two compact discs comprising:
    a) a first cover part;
    b) a second cover part;
    c) first co-operating apertures and projections on said first and second cover parts for pivotally connecting said first and second cover parts together so that said cover parts can be pivoted between a closed position facing each other to an open position;
    d) a tray comprising a planar body portion and an anchor portion, said tray body portion including means on each surface thereof for releasably securing a compact disc;
    e) means for pivotally connecting said tray body portion and said tray anchor portion together comprising a pair of arms extending from said tray body portion, a pair of recesses in said tray anchor portion for receiving said arms and co-operating openings and studs on said arms and said tray anchor portion for pivotally connecting said arms to said tray anchor portion; and
    f) second co-operating apertures and projections on said tray anchor portion and one of said cover parts for securing said tray anchor portion to one of said cover parts;
    g) so that when said cover parts are pivoted relative to each other to open said case said tray body portion can be pivoted about said anchor portion to facilitate securing and removing compact discs on either side of said tray body portion.

2. The case for holding compact discs according to claim 1, wherein said arms extend from one end of said tray body portion and are located inwardly of sides of said tray body portion.

3. The case for holding compact discs according to claim 1 wherein each of said arms is disposed in a plane substantially perpendicular to the plane of said tray body portion and fits closely but movably in a corresponding one of said recesses in said tray anchor portion.

4. The case for holding compact discs according to claim 3, wherein each of said arms is of substantial thickness in a dimension perpendicular to the plane of the arm.

5. The case for holding compact discs according to claim 1, further including co-operating structures on said tray body portion, on said tray anchor portion and on said one of said tray cover parts so that said tray body portion is pivotally movable relative to said tray anchor portion only when said tray anchor portion is secured to said one of said tray cover parts.

6. The case for holding compact discs according to claim 1, wherein each of said arms is provided with a pair of spaced-apart openings therein and wherein said tray anchor portion is provided with a pair of spaced apart studs which are received in said openings where said arms are located in said recesses so that when said tray body portion and said tray anchor portion are connected together prior to said tray anchor portion being secured to said one of said cover parts, said tray body portion is not pivotally movable relative to said tray anchor portion.

7. The case for holding compact discs according to claim 6, further including means on said tray anchor portion for contacting said one of said cover parts to move one of said studs in each of said pairs from the opening in the corresponding arm so that when said tray anchor portion is secured to said one of said cover parts said tray body portion is pivotally movable relative to said tray anchor portion.

8. The case for holding compact discs according to claim 7, wherein each of said pairs of studs is provided on a wall of said tray anchor portion linked to a member provided with a formation thereon for engaging said one of said cover parts to provide a camming action to move said wall via said link.

* * * * *